US012504058B2

(12) United States Patent
Ciolacu et al.

(10) Patent No.: US 12,504,058 B2
(45) Date of Patent: Dec. 23, 2025

(54) DEVICE FOR INCREASING THE EFFICIENCY OF ANY ROTARY POWER GENERATING SYSTEM WITH PROGRESSIVE VARIATION

(71) Applicants: Stefan Ciolacu, Brasov (RO); Simon-Andreas Maurer, Brasov (RO)

(72) Inventors: Stefan Ciolacu, Brasov (RO); Simon-Andreas Maurer, Brasov (RO)

(*) Notice: Subject to any disclaimer, the term of this patent is extended or adjusted under 35 U.S.C. 154(b) by 0 days.

(21) Appl. No.: 18/712,681

(22) PCT Filed: Nov. 4, 2022

(86) PCT No.: PCT/RO2022/000011
§ 371 (c)(1),
(2) Date: May 22, 2024

(87) PCT Pub. No.: WO2023/096517
PCT Pub. Date: Jun. 1, 2023

(65) Prior Publication Data
US 2025/0020189 A1   Jan. 16, 2025

(30) Foreign Application Priority Data
Nov. 25, 2021   (RO) .............................. a 2021 00715

(51) Int. Cl.
*F16H 33/14*   (2006.01)
*F16H 1/28*   (2006.01)
(Continued)

(52) U.S. Cl.
CPC ................. *F16H 3/58* (2013.01); *F16H 1/28* (2013.01); *F16H 1/36* (2013.01); *F16H 33/02* (2013.01);
(Continued)

(58) Field of Classification Search
CPC .......... F16H 33/14; F16H 33/185; F16H 3/58; F16H 1/36; F16H 33/02; F16H 33/08
See application file for complete search history.

(56) References Cited

U.S. PATENT DOCUMENTS 3,263,529 A * 8/1966 Borisoff .................. F16H 33/14
475/255
3,447,398 A * 6/1969 Chen ....................... F16H 33/02
475/255

(Continued)

FOREIGN PATENT DOCUMENTS

FR   2 746 163 A1   9/1997
RO   129 666 A2   7/2014

OTHER PUBLICATIONS

WIPO, U.S. International Preliminary Examining Authority, Written Opinion mailed Jun. 2, 2023 in International Patent Application No. PCT/RO2022/000011, 10 pages.

*Primary Examiner* — Sherry L Estremsky
(74) *Attorney, Agent, or Firm* — Inskeep IP Group, Inc.

(57) ABSTRACT

The invention refers to a device for increasing the efficiency of any rotary power generating system with progressive variation, whose planetary system may have two or more pairs of pinions, or/and satellites with any multiplication/demultiplication ratio with respect to the central pinion, characterized in that it consists of an assembled inner box, A, which is assembled axially in an assembled outer box, B, to which an assembled side box is axially fixed, C; assembled inner box, A, made of a primary drive shaft, (1), having a flange, by means of which the shaft is oriented and fixed on a cover, (2), in which, axially, is assembled a bearing, (3), and radially, in some bosses, a, processed cylindrically, are fixedly assembled some bearings, (4), in which, with a shoulder, conventionally right, son satellites, (Continued)

Figure 1:
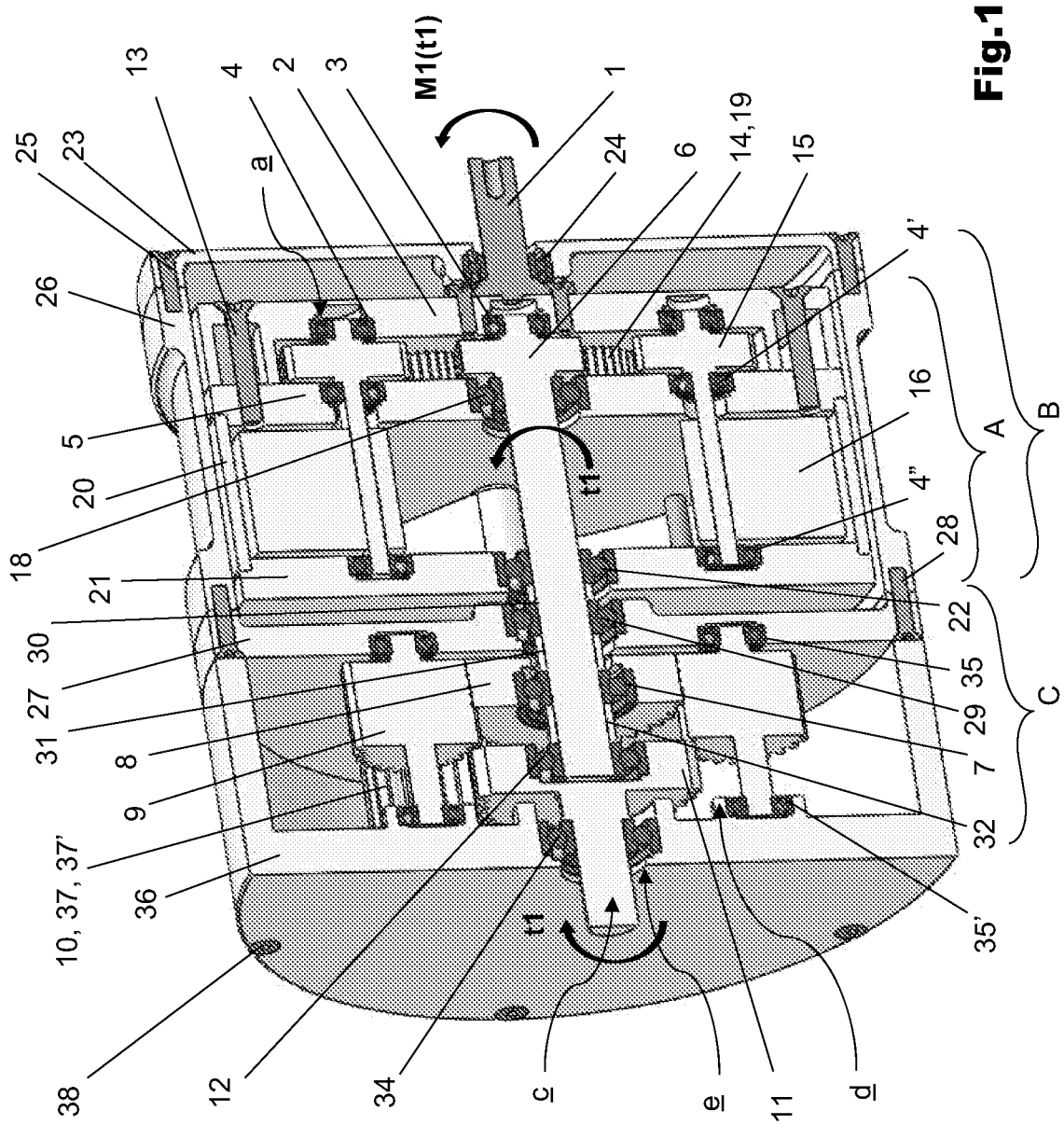

(15), are assembled, each of which, on a median shoulder, has assembled a bearing, (4'); axially, in the bearing, (3), is assembled an intermediate pinion, (6), which, to the left of its toothed crown, has assembled a second bearing, (18); in some bearings, (19), (FIG. 4) which are fixed in the cover, (2), are assembled some pinions, (14), which mesh both with the pinions, (15), and with the toothed crown of the intermediate pinion, (6); on the cover, (2), and oriented on the bearings, (4'), (18) and (19), is centered an intermediate cover, (5), which is firmly fixed to the cover, (2), by some screws, (13); on the cover, (5), being oriented and fixed a cylindrical wall, (20); on the conventional left side of each pinion, (15), one eccentric, (16), is fixed rigidly (FIG. 1, FIG. 4, FIG. 5, FIG. 6); after each eccentric, (16), on each pinion, (15), a bearing, (4"), is assembled; on each bearing, (4"), it is oriented, and on the cylindrical wall, (20), is oriented and fixed another cover, (21), in the center of which is assembled a bearing, (22), through which the intermediate pinion, (6), slides; assembled box, B, consisting of a cover, (23), oriented by means of a bearing, (24), on the primary motor shaft, (1), from the assembled inner box, A, cover, (23), on which it is oriented and fixed by means of screws, (25), with the conventionally right surface, an external cylindrical wall, (26), from which, on its conventionally left surface, a cover, (27), is oriented and fixed, by means of screws, (28); cover, (27), which is oriented by means of a bearing, (29), on the primary motor shaft, (1), and which, radially, has some bearings, (35), assembled; a spacer, (30), is interposed between the bearing, (22), and the bearing, (29), on the primary drive shaft, (1); after the bearing, (29), another spacer is assembled, (31), after which a unidirectional bearing, (7), then another spacer, (32), is assembled; assembled side box, C, consisting of a side cover, (36), provided with an axial hole, e, in which is mounted a bearing, (34), in which is assembled the output shaft, c, of a pinion, (11), in which a one-way bearing, (12), which works in the opposite direction to the one-way bearing, (7), is fixedly assembled; radially, on the same diameter on which the bearings are arranged, (35), but in the mirror, inside the side cover, (36), in some bosses, d, are mounted some bearings, (35'), in which are assembled some intermediate pinions, (9), which engages with third pinions, (10), also assembled in some bearings, (37), not shown in the figure, fixed radially in the side cover, (36); this assembled side box, C, is oriented, by means of the bearing, (12), assembled in the pinion, (11), on the primary motor shaft, (1), and, by means of the intermediate pinions, (9), in the bearings, (35), and, by means of the third pinions, (10), in some bearings, (37'), assembled in the cover, (27), and fixed to the cover, (27), by means of screws, (38).

20 Claims, 7 Drawing Sheets

(51) Int. Cl.
　　*F16H 1/36*　　(2006.01)
　　*F16H 3/58*　　(2006.01)
　　*F16H 33/02*　　(2006.01)
　　*F16H 33/08*　　(2006.01)
　　*F16H 33/18*　　(2006.01)
(52) U.S. Cl.
　　CPC ............. *F16H 33/08* (2013.01); *F16H 33/14* (2013.01); *F16H 33/185* (2013.01)

(56) References Cited

U.S. PATENT DOCUMENTS

| | | |
|---|---|---|
| 5,860,321 A | 1/1999 | Williams et al. |
| 6,044,718 A * | 4/2000 | Lester ..................... F16H 29/02 475/14 |
| 7,985,156 B2 * | 7/2011 | Han ...................... F16H 33/185 475/255 |
| 8,784,250 B2 * | 7/2014 | Garcia Benitez ....... F16H 33/08 475/16 |

* cited by examiner

Vedere X

Vedere X

DEVICE FOR INCREASING THE EFFICIENCY OF ANY ROTARY POWER GENERATING SYSTEM WITH PROGRESSIVE VARIATION

RELATED APPLICATIONS

This application is the U.S. National Phase of and claims priority to International Patent Application No. PCT/RO2022/000011, International Filing Date Nov. 4, 2022, entitled Device For Increasing The Efficiency Of Any Rotary Power Generating System With Progressive Variation; which claims benefit of and priority to Romanian Patent Application No. a 2021 00715 filed Nov. 25, 2021; both of which are incorporated herein by reference in their entireties.

The invention refers to a device for increasing the efficiency of any rotary power generating system with progressive variation, applicable in any industrial field, which aims to optimize fuel consumption by continuously changing the transmission ratio from the input motor shaft to the output shaft.

There are known gearboxes applicable to motor vehicles, with the modification of the transmission ratio in steps; they present the disadvantage that, due to the limited number of steps, the adaptation of the motor moment, whose variation is small, to the resistant moment, which has a very large variation, is discontinuous, which contributes to the decrease in dynamic qualities and the increase in fuel consumption.

Variable transmission gearboxes are also known, which have the disadvantage of using drive belts that determine both a limited mode of operation and limited mechanical parameters.

Also known is the gearbox according to U.S. Pat. No. 3,447,398 A, which refers to a torque converter interposed between a drive shaft and a driven shaft, having a drive gear rotary around a primary axis and being in connection with some planetary gears rotary around second axes parallel to the primary axis; the planetary gears being coupled with eccentric weights also rotary around the secondary axes in a predetermined phase relationship; the planetary gears and weights being coupled to a driven gear with which either one or a pair of pinions can be selectively connected, each pinion being provided with a one-way clutch engageable with a torque shaft with limited rotation and essentially fixed; clutches operating in opposite directions; preferably both the drive shaft and the driven shaft, as well as the torque shaft, being fitted with torque dampers to smooth torque variations.

A gearbox is also known according to patent FR1588205 which refers to an automatic speed and torque converter with continuous variation, made up of a hypocycloidal planetary gear, whose internal gear ring has been removed, as a result the device remains composed of—a satellite drive motor shaft, driving a satellite that meshes with a central pinion to be mounted on the output shaft, this satellite having a mass with a determined weight fixed to its periphery; the whole assembly rotating uniformly, with a determined and uniform input torque, so that if there is an increase in the resisting torque on the output shaft, this increase will result in a proportional decrease in the speed of this shaft, and consequently in a speed difference between input and output shafts; the difference in speed will cause the satellite to rotate on itself; in this rotation of the satellite, the mass attached to it will sometimes approach, sometimes move away from the axis of rotation of the apparatus, and therefore its circumferential velocity will vary in proportion to its distance from this axis. At the moment of mass speed increase, the consequent increase in force will require an increase in power that will be automatically taken at that moment from the engine torque, then at that moment of mass speed reduction, it will be restored to the output shaft from which it will end up increasing the torque to compensate for the increase in resistive torque produced on this shaft by reducing the speed as stated. This transfer of energy from the motor shaft to the mass output shaft and this conversion of speed into torque varies proportionally to the difference in speed of the two shafts with the following characteristic points: a) If the speeds of the two shafts are equal, the satellite will not spin and no speed to torque conversion occurs. b) If the speed of the output shaft drops to zero, that of the input shaft always remaining the same, then the entire speed is converted into a torque, the output torque becomes infinitely large, but no power is available on this output shaft, its speed being zero. The device then acts as a clutch. c) If the speed of the output shaft becomes greater than that of the input shaft, and therefore the torque less than that of this shaft, the satellite and its mass will start themselves, but in the opposite direction than before, the extra power then being converted into speed to compensate for the difference in speed between the two shafts instead of being converted into torque as in the previous case. d) Finally, instead of reducing the speed to zero, the output shaft can also rotate in the opposite direction, thus automatically giving a reverse direction if desired. All these speed and torque variations are done automatically without the need to use any control device, the machine acting exactly like a kind of rotary torque rocker. On the other hand, considering the irregularity of the torque transmitted by the mass to the output shaft, 4 planetary gears instead of one are mounted on the periphery of the pinion and 4 masses instead of just one, these 4 masses being placed on the periphery of the satellites so that the forces transmitted by them to balance each other, the resulting total force on the output shaft being then perfectly regularized. The transmittable power capacity of the device is then quadrupled. These satellites and these masses can also be 3, 6, 8 or more in number depending on the requirements, provided that the forces transmitted to the output shaft are balanced between them. Other types of differential gears may be used, provided they allow the fundamental principles of the device to be applied. This device applies to automobiles, machine tools, tractors, motorcycles, railways, etc.

All these solutions present the disadvantage that they do not use the principle of energy accumulation in the steering wheel, as well as the disadvantage that they only use part of the generated force.

A planetary gear box with progressive variation Is also known according to patent RO 12966 A2, which allows continuous modification of the transmission ratio. Due to the fact that the direction of rotation of the inner box is the same as the direction of rotation of the eccentric pinions, the disadvantage arises that the mechanism introduces an additional mass moment of inertia, which translates into additional resistance to rotation, which induces additional consumption of fuel; In addition, the use of conical pinions to create the mechanical system induces an additional cost and an increase in the complexity of the adjustment during assembly.

The technical problem that the present invention solves is to decrease the fuel consumption required for the operation of an engine.

The technical problem is solved by the invention by making a device for increasing the efficiency of any rotary power generating system with progressive variation that has the primary motor shaft (input) inertial-centrifugally coupled to the secondary (output) shaft. This inertial-centrifugal coupling ensures an independent movement of the shafts and eliminates the disadvantages presented in the inventions listed in the previous paragraph, by eliminating the mechanical couplings between the shafts. Also, by using the flywheel effect and the full use of the force generated, this invention practically increases the efficiency compared to those present in the above reference inventions.

The advantage of this invention are numerous:
the field of applicability of this device is vast, starting from the vehicle industry to any of the branches of the industry where continuous change of speed is needed.
Reduces power losses to a greater extent than conventional automatic transmissions, improving efficiency and acceleration, by keeping the engine speed constant;
Automatic adaptation, dynamically, of the moment of exit from the device, to the same amount of fuel of any kind;
Improved dynamics due to the lack of traction force interruption;
Improves dynamic and energetic performances in transient regimes;
Improving driving comfort by automating clutch engagement and by not needing to change transmission ratios;
Improving the control of polluting emissions and reducing the noise level.

Figure 2:
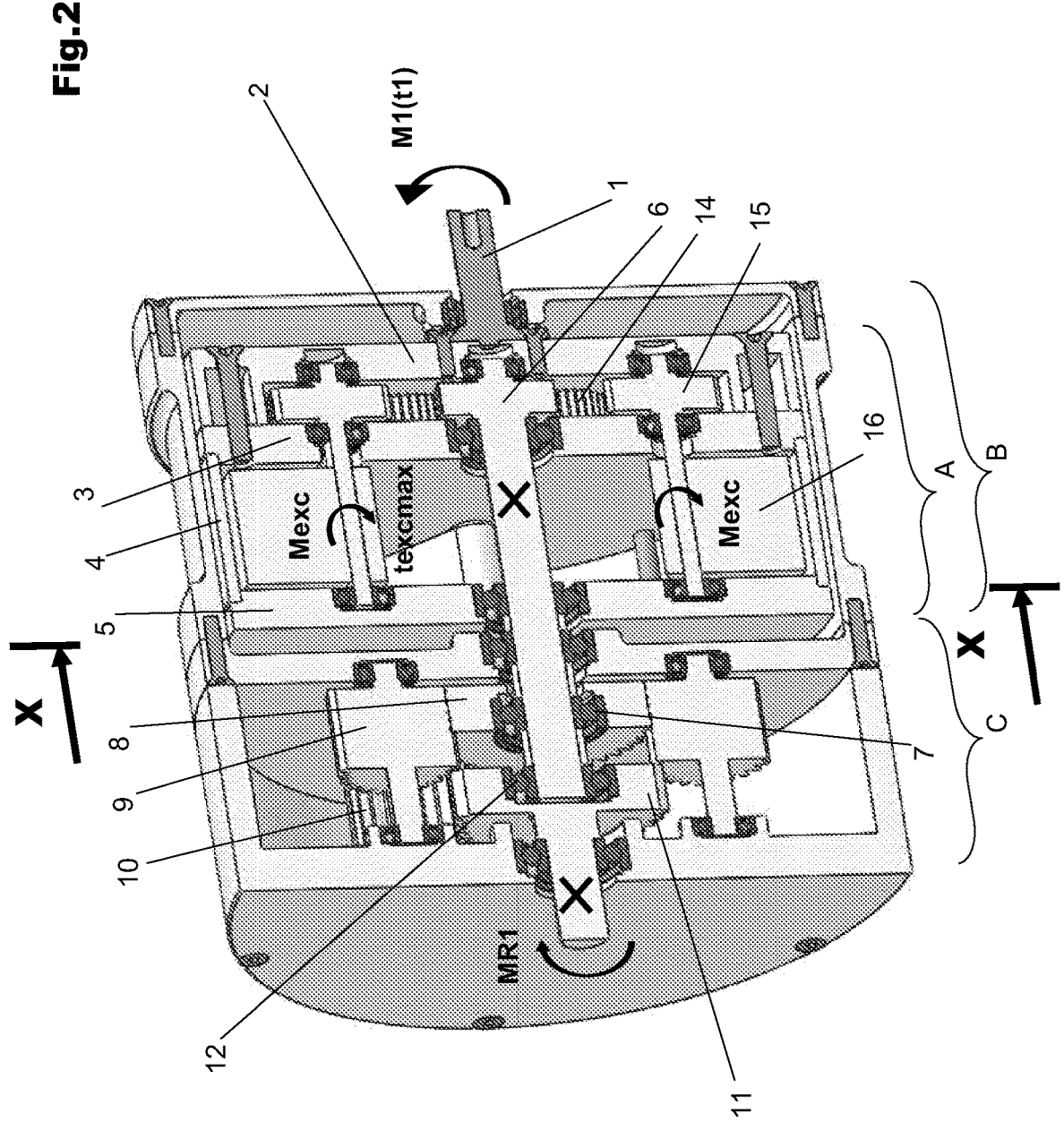
Figure 3:
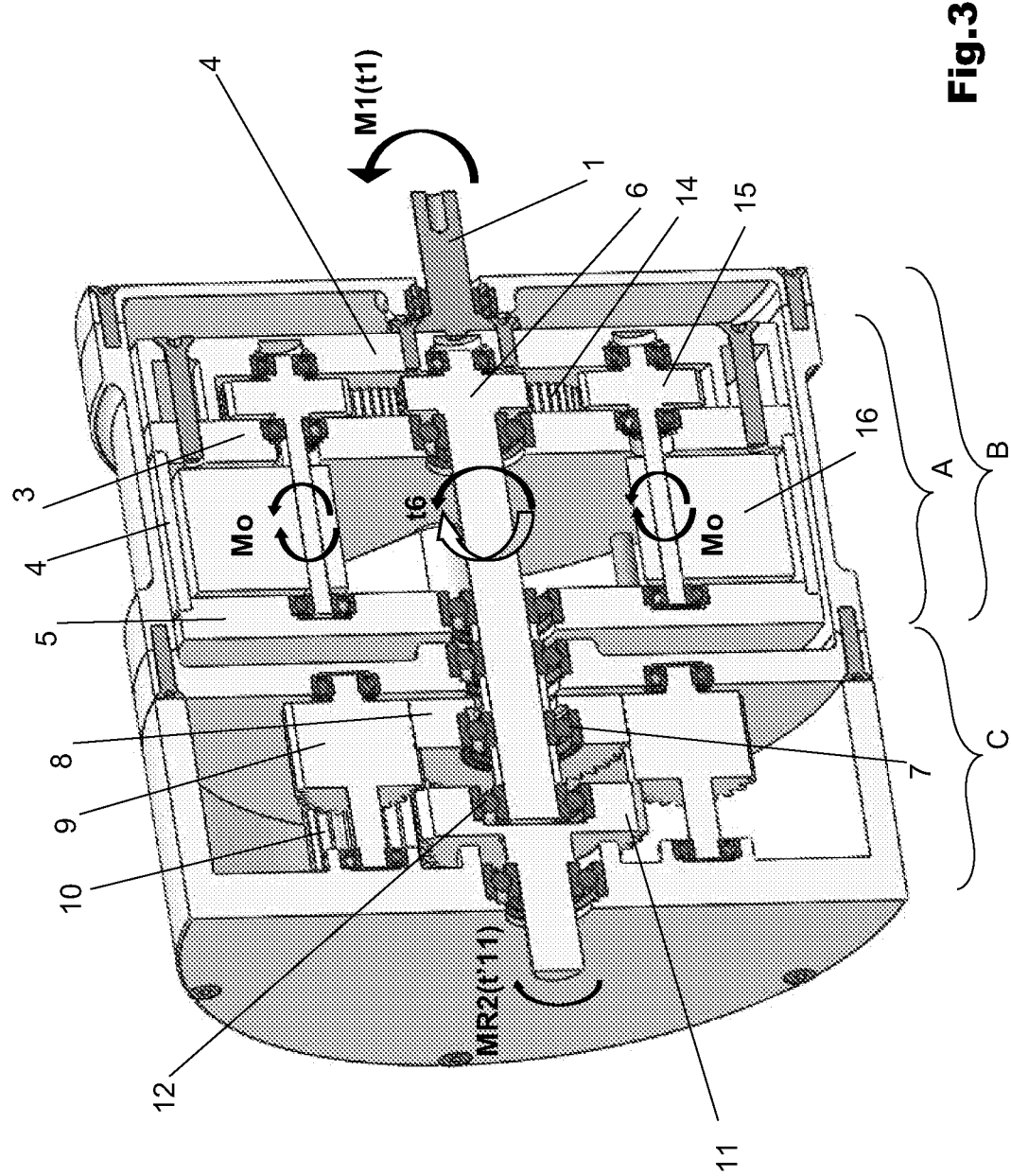
Figure 4:
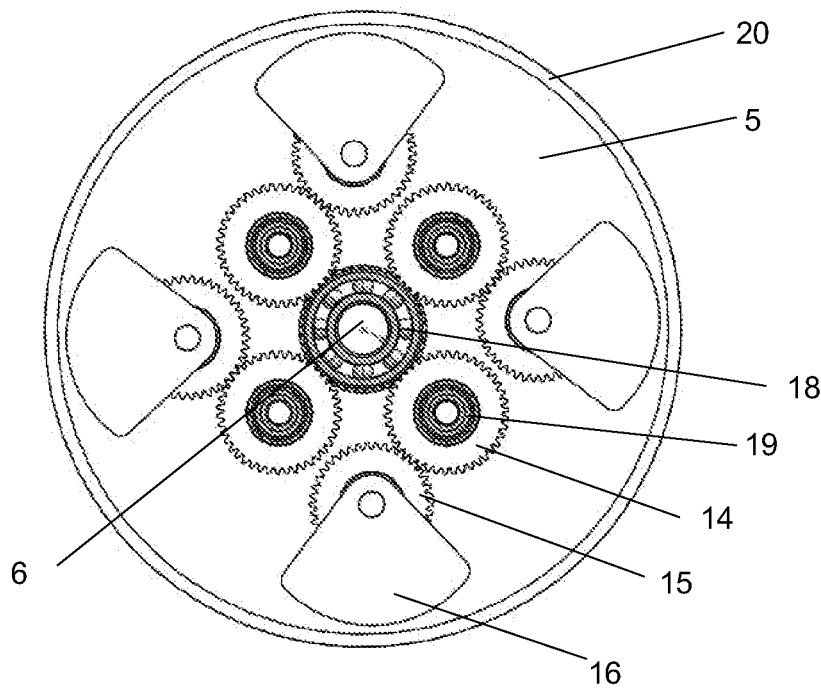
Figure 5:
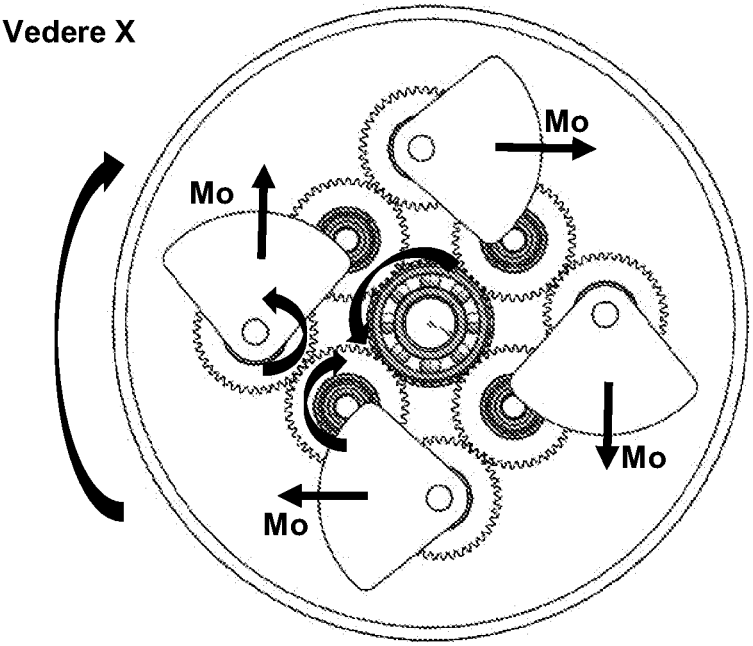
Figure 6:
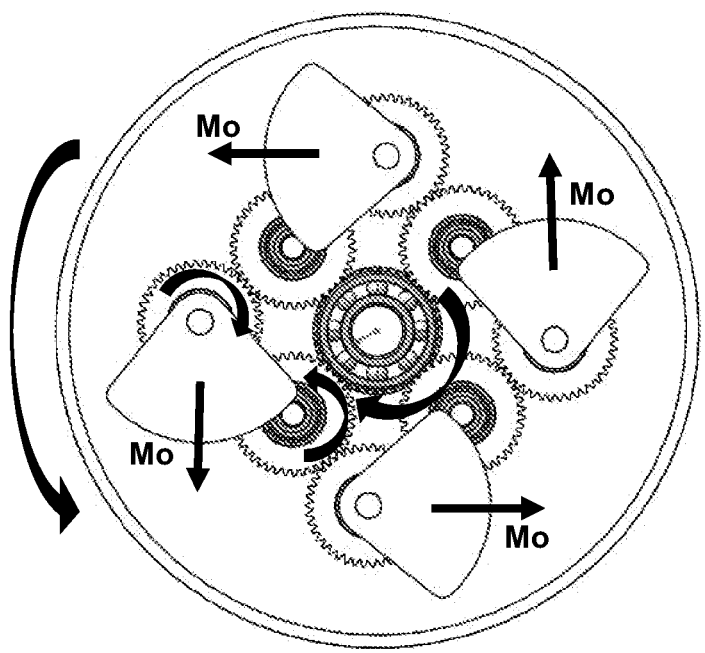
Figure 7:
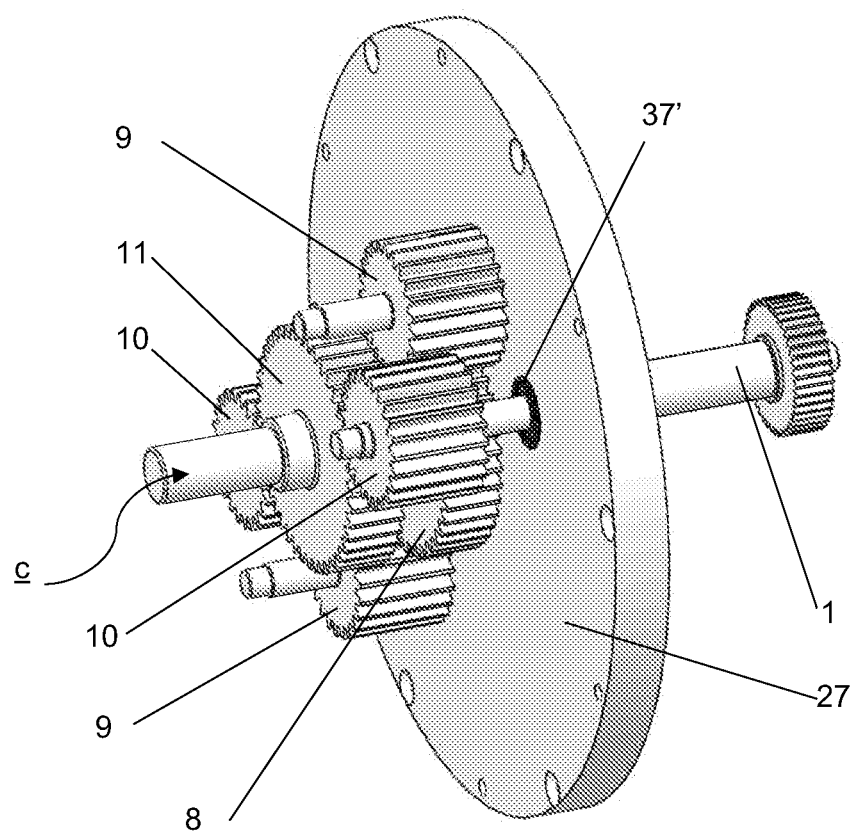
Figure 7:
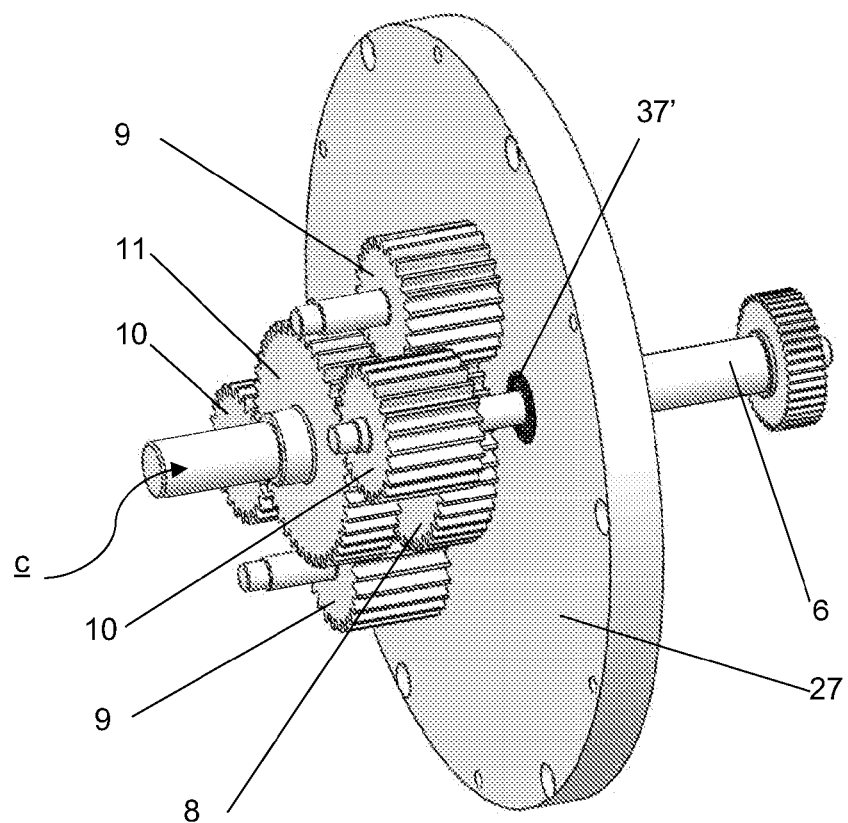

Below is an example of a device for increasing the efficiency of any rotary power generating system with progressive variation, with reference also to FIGS. 1 to 7, which represent:

FIG. 1—longitudinal section through the device for increasing the yield of any rotary system generating power with progressive variation, with the indication of the moments and revolutions at idle;

FIG. 2—explanation of the mode of operation in the situation where the output shaft is acted upon by a resistive moment, MR1, which completely blocks (MR1=M1) its movement;

FIG. 3—explanatory on the mode of operation in the situation where the output shaft is acted upon with a resistive moment MR2 smaller than MR1, the output shaft rotary with a revolution t'11<t1 of the input shaft FIG. 4—view from X; the position of the eccentrics when idling;

FIG. 5—view from X; the position of the eccentrics in the situation where the output shaft is acted upon with a resistive moment MR2 smaller than MR1, the output shaft will rotate with a revolution t'11<t1 of the input shaft and will transmit, through the unidirectional bearing, a movement of rotational speed t6<t1 on the intermediate pinion which will transmit movement, through the pinions, to the eccentrics which, through their rotational movement, will create an oscillating moment of inertia, Mo FIG. 6—view from X; the position of the eccentrics in the situation where the output shaft is acted upon with a resistive moment MR2 smaller than MR1, the output shaft will rotate with a revolution t'11<t1 of the input shaft and transmit, through the unidirectional bearing, the direction conversely, a rotational motion of speed t6<t1 on the intermediate pinion which will transmit motion, through the pinions, to the eccentrics which, through their rotational motion, will create an oscillating moment of inertia, Mo FIG. 7—partial view of the pinions in box C (solution with two pinions)

An example embodiment of the invention is given below, which according to FIG. 1, consists of an assembled inner box, A, which is assembled axially in an assembled outer box, B, to which an assembled side box is axially fixed, C;

assembled inner box, A, made of a primary drive shaft, 1, having a flange, by means of which the shaft is oriented and fixed on a cover, 2, in which, axially, a bearing, 3, is assembled and radially, in some bosses, a, processed cylindrically, some bearings, 4, are fixedly assembled in which, with a shoulder, conventionally right, some satellites, 15, are assembled, each of which, on a median shoulder, has assembled a bearing, 4*; axially, in the bearing, 3, an intermediate pinion, 6, is assembled, which, to the left of its toothed crown, has a second bearing assembled, 18; in some bearings, 19, (FIG. 4) which are fixed in the cover, 2, some pinions, 14 as satellites, are assembled, which mesh both with the pinions, 15 which are straight-cut gears, and with the toothed crown of the intermediate pinion, 6 (straight-cut gear); on the cover, 2, and oriented on the bearings, 4', 18 and 19, an intermediate cover, 5, is centered, which is firmly fixed to the cover, 2, by some screws, 13; on the cover, 5, being oriented and fixed a cylindrical wall, 20;

on the conventional left side of each pinion, 15, one eccentric, 16, is fixed rigidly (FIG. 1, FIG. 4, FIG. 5, FIG. 6);

after each eccentric, 16, on each pinion, 15, is assembled a bearing, 4"; on each bearing, 4", it is oriented, and on the cylindrical wall, 20, another cover, 21, is oriented and fixed, in the center of which is assembled a bearing, 22, through which the shaft portion of the intermediate pinion, 6, slides; assembled box, B, consisting of a cover, 23, oriented by means of a bearing, 24, on the primary drive shaft, 1, from the assembled inner box, A, cover, 23, on which it is oriented and fixed by means of screws, 25, with the conventionally right surface, an external cylindrical wall, 26, from which, on its conventionally left surface, a cover, 27, is oriented and fixed, by means of screws, 28;

cover, 27, which is oriented by means of a bearing, 29, on the shaft portion of the intermediate pinion 6, and which, radially, has some bearings, 35, assembled; a spacer, 30, is interposed between the bearing, 22, and the bearing, 29, on the shaft portion of the intermediate pinion 6; after the bearing, 29, another spacer, 31, is assembled after which a unidirectional bearing, 7, then another spacer, 32, are assembled;

assembled side box, C, consisting of a side cover, 36, provided with an axial hole, e, in which is mounted a bearing, 34, in which is assembled the output shaft, c, of a pinion, 11 (straight-cut gear), in which a one-way bearing, 12, which works in the opposite direction to the one-way bearing, 7, can be fixedly assembled; radially, on the same diameter on which the bearings are arranged, 35, but in the mirror, inside the side cover, 36, in some bosses, d, are mounted some bearings, 35', in which some intermediate pinions, 9 (straight-cut gear), can be assembled, which engages with third pinions, 10 (straight-cut gear), also assembled in some bearings, 37, not shown in the figure, fixed radially in the side cover, 36;

this assembled side box, C, is oriented, by means of the bearing, 12, assembled in the pinion, 11, on the shaft portion of the intermediate pinion 6, and, by means of the intermediate pinions, 9, in the bearings, 35, and, by means of the third pinions, 10, in some bearings, 37*, assembled in the cover, 27, and fixed to the cover, 27, by means of screws, 38.

MODE OF OPERATION

According to FIG. 1, by acting from the motor with a moment, M1, at a revolution, t1, on the primary drive shaft, 1, at idle, it acts on the assembled box, A, which, by means of the inertial coupling consisting of the pinions, 15, on which the eccentrics, 16, are fixedly assembled, and which drive the pinions, 14 which are straight-cut gears, which drive the combined shaft portion and the intermediate pinion, 6, which rotates at the same speed, t1, and in the same direction as the primary drive shaft, 1, actuate the one-way bearing, 7, on which is fixed the pinion, 8 (straight-cut gear), which engages the intermediate pinion, 9, which drives the third pinion, 10, which actuates the output shaft, 11, because the one-way bearing, 12, is mounted in the opposite direction to the one-way bearing, 7; the eccentrics, 16, will remain motionless; the output shaft will rotate with the same speed, t1, but in the opposite direction; this would be the situation in which, for example, a car would go downhill, without brakes, with the engine running at t1 speed, and the wheels would take over the movement corresponding to this speed, without resistance; According to FIG. 2, in the situation where the output shaft, 11, is acted upon by a resistive moment, MR1, which completely blocks (MR1=M1) its movement; on the primary drive shaft, 1, acting with the same moment, M1, at the same speed, t11(MR1)=t1, by means of the unidirectional bearing, 12, the shaft portion and the intermediate pinion, 6, and, as a result, the pinions, 14, are locked they will drive the pinions, 15, which will drive the eccentrics, 16, these creating a moment of inertia Mexc; as a result, the eccentrics, 16, will rotate symmetrically, with a maximum speed, texemax; this would be the situation where, for example, a car would have revved the engine at speed t1 and braked completely; According to FIG. 3, in the situation where the output shaft, 11, is acted upon with a resistive moment MR2 smaller than MR1, the output shaft, 11, will rotate with a revolution, t'11<t1, of the primary drive shaft, 1, and will transmit, through the one-way bearing, 12, a rotational movement of speed t6<t1 on the intermediate pinion, 6, which will transmit movement, through pinions, 14 and 15, to the eccentrics, 16, which, through the movement their rotation, will create an oscillating moment of inertia, Mo, according to FIG. 5 and FIG. 6, which, through the same pinions, 15 and 14, will transmit the oscillating moment, Mo, to the intermediate pinion, 6, which will act alternately on the one-way bearings, 7 and 12, so that, at the output pinion, 11, a continuous rotational movement will result, with the same speed, t'11 (MR2); At a complete rotation of the pinion, 15, with the eccentric, 16, due to their relative rotation movement with respect to the intermediate pinion, 6, in the first half of rotation (FIG. 4), a first moment of inertia is created which binds the intermediate pinion, 6, to have a movement in one direction; and in the second half of rotation (FIG. 5), a moment of inertia of the opposite direction is created which forces the intermediate pinion, 6, to move in the opposite direction; after the cessation of action with the resistive moment, MR1, due to the centrifugal force acting on the eccentrics, 16, they will return to the radial axial equilibrium position, according to FIG. 3.

The invention claimed is:

1. A planetary gearbox with progressive variation, the planetary gearbox comprising:
    an input shaft fixedly connected to a first cover of a first housing configured to rotate;
    an intermediate shaft extending concentrically with the input shaft within the first housing, the intermediate shaft including a first pinion gear and a second pinion gear;
    a plurality of first satellite gears each engaged with the first pinion gear;
    a plurality of second satellite gears each engaged with at least one first satellite gear of the plurality of first satellite gears, wherein each gear of the plurality of second satellite gears is fixedly located on a shaft supported by the first cover of the first housing, the shaft extending parallel to and radially offset from the intermediate shaft, and wherein each shaft includes an eccentric weight fixedly affixed to the shaft;
    an output shaft extending concentrically with the intermediate shaft, the output shaft including a third pinion gear;
    a first one-way bearing located between the intermediate shaft and the second pinion gear, the first one-way bearing configured to cause the second pinion gear to rotate with the intermediate shaft during rotation of the intermediate shaft in a first direction and allow the second pinion gear to freewheel on the intermediate shaft during rotation of the intermediate shaft in a second direction;
    a first intermediary gear engaged with the second pinion gear;
    a second intermediary gear engaged with the first intermediary gear;
    the output shaft including the third pinion gear engaged with the second intermediary gear; and
    a second one-way bearing located between the third pinion gear and the intermediate shaft, the second one-way bearing configured to cause the output shaft to rotate with the third pinion gear during rotation of the second intermediary gear in the first direction and allow the third pinion gear to freewheel during rotation of the output shaft in the first direction.

2. The planetary gearbox of claim 1, wherein a first end of the shaft on which each gear of the plurality of second satellite gears is located is supported by a bearing housed within the first cover of the first housing; and wherein a second end of the shaft on which each gear of the plurality of second satellite gears is located is supported by a bearing housed within a second cover of the first housing that is affixed to the first cover.

3. The planetary gearbox of claim 2, wherein each gear of the plurality of first satellite gears is located adjacent to the first end of the shaft; and wherein each eccentric weight is located adjacent to the second end of the shaft.

4. The planetary gearbox of claim 1, wherein the plurality of first satellite gears and the plurality of second satellite gears each include four individual gears.

5. The planetary gearbox of claim 4, wherein each gear of the plurality of first satellite gears is engaged with one individual gear of the plurality of second satellite gears and the first pinion gear.

6. The planetary gearbox of claim 1, wherein the first intermediary gear comprises a pair of individual gears; and wherein the second intermediary gear comprises a pair of individual gears.

7. The planetary gearbox of claim 1, wherein the first pinion gear is located on the intermediate shaft in a position adjacent to the input shaft within the first housing; and wherein the second pinion gear is located on the intermediate shaft in a position adjacent to the output shaft within a third housing fixedly coupled to a second housing; and wherein the first housing is configured to rotate within the second housing.

8. The planetary gearbox of claim 7, wherein the output shaft, the first intermediary gear, the second intermediary gear, the second pinion gear of the intermediate shaft, the third pinion gear of the output shaft, the first one-way bearing, and the second one-way bearing are each located within the third housing.

9. The planetary gearbox of claim 8, wherein the third housing includes a third cover that houses a third shaft bearing supporting the intermediate shaft in a location adjacent to the first one-way bearing; and wherein the third housing includes a fourth cover that houses a fourth shaft bearing supporting the output shaft in a location adjacent to the second one-way bearing within the third housing.

10. The planetary gearbox of claim 9, wherein the second housing includes a fifth cover; and wherein the input shaft extends through the fifth cover of the second housing into first cover the first housing.

11. The planetary gearbox of claim 10, wherein the third shaft bearing housed by the third cover of the third housing is located between the first one-way bearing and a second shaft bearing housed by a second cover of the first housing that is affixed to the first cover.

12. The planetary gearbox of claim 11, wherein the first cover houses a first shaft bearing supporting the intermediate shaft and the second cover houses a second shaft bearing supporting the intermediate shaft.

13. A planetary gearbox with progressive variation, the planetary gearbox comprising:
an input shaft fixedly connected to a first cover of a first housing, wherein the input shaft is inertia-centrifugally connected to an intermediate shaft;
the intermediate shaft extending concentrically with the input shaft within the first housing, the intermediate shaft including a first pinion gear and a second pinion gear;
an output shaft extending concentrically with the intermediate shaft, the output shaft including a third pinion gear;
a first one-way bearing located between the intermediate shaft and the second pinion gear, the first one-way bearing configured to cause the second pinion gear to rotate with the intermediate shaft during rotation of the intermediate shaft in a first direction and allow the second pinion gear to freewheel on the intermediate shaft during rotation of the intermediate shaft in a second direction;
one or more first intermediary gears engaged with the second pinion gear;
one or more second intermediary gears engaged with the one or more first intermediary gears;
the output shaft including a third pinion gear engaged with the one or more second intermediary gears; and
a second one-way bearing located between the third pinion gear and the intermediate shaft, the second one-way bearing configured to cause the output shaft to rotate with the third pinion gear during rotation of the one or more second intermediary gears in the first direction and allow the third pinion gear to freewheel during rotation of the output shaft in the first direction.

14. The planetary gearbox of claim 13, wherein the first housing is configured to rotate within a second housing; wherein a third housing coupled to the second housing defines an outer diameter that is equal to an outer diameter of the second housing; and wherein the output shaft extends concentrically with the intermediate shaft within the third housing.

15. The planetary gearbox of claim 14, wherein the one or more first intermediary gears and the one or more second intermediary gears each include two individual gears; wherein each gear of the one or more first intermediary gears is spaced circumferentially apart from other gears of the one or more first intermediary gears by about 180 degrees relative to a central axis of the intermediate shaft; and wherein each gear of the one or more second intermediary gears is spaced circumferentially apart from other gears of the one or more second intermediary gears by about 180 degrees relative to a central axis of the intermediate shaft.

16. The planetary gearbox of claim 15, wherein the first pinion gear is a toothed crown of the intermediate shaft.

17. The planetary gearbox of claim 16, wherein the third housing includes a third cover housing a third shaft bearing supporting the intermediate shaft in a location adjacent to the first one-way bearing; and wherein the third housing includes a fourth cover housing a fourth shaft bearing supporting the output shaft adjacent the second one-way bearing within the third housing.

18. The planetary gearbox of claim 17, wherein the input shaft is inertia-centrifugally coupled to the intermediate shaft via a plurality of first satellite gears each engaged with the first pinion gear and a plurality of second satellite gears each engaged with at least one first satellite gear of the plurality of first satellite gears, wherein each of the plurality of second satellite gears is fixedly located on a shaft supported by the first cover of the first housing, the shaft extending parallel to and radially offset from the intermediate shaft, and wherein each shaft includes an eccentric weight fixedly affixed to the shaft.

19. The planetary gearbox of claim 18, wherein the plurality of first satellite gears and the plurality of second satellite gears includes each include four individual gears; wherein each gear of the plurality of first satellite gears and each gear of the plurality of second satellite gears is spaced circumferentially apart from other gears of the plurality of first satellite gears and the plurality of second satellite gears, respectively, by about 90 degrees relative to a central axis of the intermediate shaft.

20. The planetary gearbox of claim 19, wherein each of the first pinion gear, the second pinion gear, the third pinion gear, the one or more first intermediary gears, the one or more second intermediary gears, the plurality of first satellite gears, and the plurality of second satellite gears is a straight-cut gear.

* * * * *